Patented June 4, 1935

2,004,063

UNITED STATES PATENT OFFICE 2,004,063

OSCILLATABLE PIVOTALLY MOUNTED AXLE

Joseph Ganz, Frankfort-on-the-Main, Germany

Application May 2, 1933, Serial No. 668,965
In Germany May 7, 1932

5 Claims. (Cl. 180—73)

Separate wheel suspensions (pivotally mounted axles) are divided into systems which maintain the wheels parallel to their initial position during the bending of the springs and systems in which a more or less great change of the position of the axle pin or of the track takes place during the bending of the springs. The last mentioned systems, also called oscillatable axles, have the property of resisting pitching vibrations of the vehicle owing to the high natural damping due to the pneumatic rolling work on the ground and, especially when the centre of gravity of the stub axles is situated laterally of the plane of symmetry of the vehicle, tend to maintain level the vehicle body against the action of centrifugal force when negotiating curves.

The employment of oscillatable axles which change the position of the axle pins and the track, was not possible in the hitherto known forms of construction, in all cases where this might have been advisable. For hingedly connecting the supporting axle stubs to the chassis a suitable horizontal base was necessary. The fulcrum bearings must either be situated sufficiently far apart to enable the thrust forces to be transmitted without causing too great specific stresses or, for example, triangular supports had to be employed.

All these forms of construction require a considerable amount of space. However, space is not available where it is required for these pivotally mounted axle systems, namely in the horizontal plane through the axle drive, especially if the axle is made in a block with the engine clutch and gearing, because it will be then occupied by the other driving elements. If the thrust forces are absorbed by peripheral longitudinal stays or the like, the wheels perform an unfavorable rolling movement when yielding. The articulation of the thrust stays requires delicate bearings with the possibility of universal movement and the transverse forces, increased by the resultant of the power triangle, must be absorbed by the wheel shafts and moreover stress the Cardan joints of the power transmission. This occurs particularly in the case of those above mentioned constructions which, whilst putting up with the unfavorable stressing of the springs utilized for the guiding, arrange same above, below or both above and below the axles but hingedly connect these springs directly to the wheel supporting bearings.

The pivotally mounted axle system according to the invention avoids the objections of the known arrangements. It represents a combination of an oscillating axle and an ordinary parallel wheel guide, the space for the axle drive not being restricted by the axle supporting parts.

According to the invention the wheel supporting bearings, constructed if necessary also to absorb the transverse forces, are pivotally suspended in the peripheral elements which are resilient in vertical direction. Such an axle is illustrated by way of example in the only figure of the accompanying drawing.

An axle supporting casing 1 is fixed on the vehicle chassis and carries, if necessary, the axle driving elements 2. Above and below the axle casing 1 transverse sets of blade springs 3 and 4, links or the like are mounted. The sets of blade springs or the like are inter-connected at their ends 5, 6 and 7, 8 by means of bridges 9 and 10. These bridges are here illustrated as the above mentioned vertically and resiliently guided peripheral elements and supplement the springs or the like to form articulated quadrangular systems. Supporting bearings 11 and 12 of the wheels 13 and 14 are suspended on these bridges 9 and 10 and oscillate about horizontal axes 19 and 20 extending parallel to the longitudinal axis of the vehicle or are constructed as oscillatable bearings. The axles 15 and 16 of the wheels are capable of swinging around the joints 17 and 18. The hubs of the wheels are fixed on the axles 15 and 16. The left side of the drawing shows the position of the spring suspension in loaded condition, whereas the right side of the same shows the same in unloaded condition. It is clear herefrom without further explanation that the peculiar changing of the position of the pivot pins and of the track takes place also with this arrangement during the bending of the springs.

On the other hand, however, the pivotally mounted axle is free from highly stressed bulky supporting joints in proximity to the axle drive. The existing joints are situated outside the range of the drive and in the example illustrated are limited to such which are in the line of action of the wheels. The thrust forces acting on the joints 17 and 18 are very slight owing to the ratio of the leverage resulting herefrom. The main forces are resiliently taken up without joints by the supporting springs 3 and 4. These springs oppose particularly the thrust and torsional forces, caused by possible braking moments, by the resistance moments of their vertically stressed profile.

As the outer joints of the supporting system are situated near the wheel track and are there-

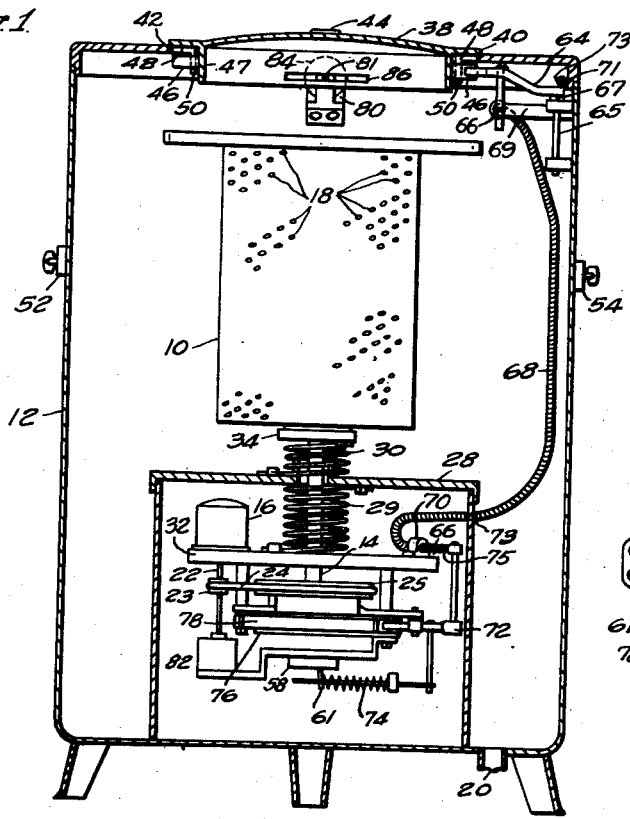
June 4, 1935. R. H. JORDAN ET AL 2,004,064
CLOTHES SPINNER
Filed Feb. 21, 1934
INVENTORS.
Richard H. Jordan
and Paul E. Hochstetter.
BY
W. R. Coley
ATTORNEY
WITNESSES:
E. A. M<sup>c</sup>Closkey.
C. F. Bryant